(12) United States Patent
Ying et al.

(10) Patent No.: US 12,740,670 B2
(45) Date of Patent: Sep. 22, 2026

(54) COOKING APPLIANCE WITH HIGH-TEMPERATURE ZONE

(71) Applicant: NINGBO AGSUN PRODUCTS, INC., Cixi (CN)

(72) Inventors: Luoda Ying, Cixi (CN); Chao Fu, Cixi (CN); Meng Lin, Cixi (CN)

(73) Assignee: NINGBO AGSUN PRODUCTS, INC., Cixi (CN)

( * ) Notice: Subject to any disclaimer, the term of this patent is extended or adjusted under 35 U.S.C. 154(b) by 427 days.

(21) Appl. No.: 18/469,075

(22) Filed: Sep. 18, 2023

(65) Prior Publication Data

US 2024/0000264 A1 Jan. 4, 2024

(30) Foreign Application Priority Data

Jun. 8, 2023 (CN) ........................ 202321456994.9

(51) Int. Cl.

| | |
|---|---|
| ***A47J 37/07*** | (2006.01) |
| ***F24C 3/08*** | (2006.01) |
| ***F24C 15/24*** | (2006.01) |

(52) U.S. Cl.

CPC ........... *A47J 37/0713* (2013.01); *F24C 3/085* (2013.01); *F24C 15/24* (2013.01)

(58) Field of Classification Search

CPC .... A47J 37/0713; A47J 37/0647; A47J 37/07; A47J 37/0727; F24C 3/085; F24C 3/08; F24C 3/082; F24C 3/04; F24C 3/042; F24C 3/047; F24C 3/10; F24C 15/24; F24C 15/22; F24D 14/14; F24D 14/147; F24D 14/151; F24D 14/145; F24D 14/84

USPC ................................ 431/326, 327, 328, 329

See application file for complete search history.

(56) References Cited

U.S. PATENT DOCUMENTS

| | | | | |
|---|---|---|---|---|
| 2005/0284461 A1* | 12/2005 | Hsu | F24C 15/24 126/41 R | |
| 2008/0000361 A1 | 1/2008 | Zwergel | | |
| 2008/0182216 A1* | 7/2008 | O'Donnell | F24H 1/205 431/328 | |

(Continued)

FOREIGN PATENT DOCUMENTS

| | | | |
|---|---|---|---|
| CN | 203914590 U * | 11/2014 | A47J 37/06 |
| CN | 106419625 A | 2/2017 | |

(Continued)

OTHER PUBLICATIONS

Machine Translation of WO-2021227257 (Year: 2021).*

*Primary Examiner* — Allen R. B. Schult
*Assistant Examiner* — Amy E Carter

(57) ABSTRACT

The disclosure provides a cooking appliance with a high-temperature zone which has a housing, a first heating group and a second heating group are mounted within a heating chamber of the housing, the first heating group forms an ordinary uniform temperature grilling zone by means of a gas burner, and the second heating group forms a high-temperature grilling zone by means of a combination of the gas burner and an infrared burner, so as to additionally provide an infrared high-temperature grilling function for users and satisfy needs of the users for uniform temperature performance and high-temperature grilling on the premise of realizing the uniform temperature performance in an oven.

7 Claims, 7 Drawing Sheets

(56) References Cited

U.S. PATENT DOCUMENTS

| | | | | |
|---|---|---|---|---|
| 2009/0255414 | A1* | 10/2009 | Wang | A47J 37/0713 99/446 |
| 2009/0314278 | A1* | 12/2009 | Bruno | F23K 5/007 126/41 R |
| 2018/0146825 | A1* | 5/2018 | Qian | A47J 37/0713 |
| 2020/0229644 | A1* | 7/2020 | Mao | A47J 37/0713 |
| 2022/0133090 | A1 | 5/2022 | Shen | |
| 2022/0183503 | A1 | 6/2022 | Laprise et al. | |

FOREIGN PATENT DOCUMENTS

| | | | | |
|---|---|---|---|---|
| WO | WO-2008086564 | A1 * | 7/2008 | F23D 14/145 |
| WO | WO-2021227257 | A1 * | 11/2021 | A47J 37/0713 |

* cited by examiner

COOKING APPLIANCE WITH HIGH-TEMPERATURE ZONE

TECHNICAL FIELD

The present invention pertains to the technical field of food cooking, and specifically pertains to a cooking appliance with a high-temperature zone.

BACKGROUND

In modern society, food is often cooked by baking, and a cooking appliance with a high-temperature zone commonly used in this method is an oven which bakes and cooks food by hot air formed. At present, to avoid uneven baking of the baked food during cooking, burners of the same mode are uniformly distributed in an oven to form a burning system to ensure uniform temperature performance in the oven. For example, patent publication No. CN106419625A discloses an improved oven. However, such single baking method is unavailable for high-temperature grilling, resulting in inability to meet customers' needs for uniform temperature performance and high-temperature grilling at the same time.

SUMMARY

The purpose of the present invention is to provide a cooking appliance with a high-temperature zone designed to solve the above-mentioned technical deficiency.

The cooking appliance with a high-temperature zone according to the present invention comprises:

- a housing which comprises a heating chamber; and
- a burning system which is mounted within the heating chamber and comprises a first heating group and a second heating group;
  - the first heating group comprises a first grilling net and a first heat generating device capable of generating heat, and the first heat generating device is located below the first grilling net; and
  - the second heating group is located beside the first heating group, the second heating group comprises a second grilling net and a high-temperature generating device capable of generating high heat, the high-temperature generating device is located at least partially below the second grilling net, the high-temperature generating device comprises an infrared heating device and a second heat generating device located on at least one of two opposite sides of the infrared heating device, and the infrared heating device, the second heat generating device and the second grilling net form the high-temperature zone together; and the second heat generating device is located at least partially below the second grilling net.

According to the cooking appliance with a high-temperature zone described above, the infrared heating device comprises an infrared burner, a cover body and an ignition needle, both ends of the cover body are formed by extending toward inner walls of a front side and a rear side of the heating chamber respectively, the cover body is arranged above a burning portion of the infrared burner, the cover body is provided with a cavity, an opening in communication with the cavity and a plurality of first heat dissipation holes, and the ignition needle is placed in the cavity through the opening.

According to the cooking appliance with a high-temperature zone described above, the infrared burner is an infrared burner head, an edge of a lower port portion of the cover body is formed with positioning bodies which are provided continuously or at intervals, and the positioning bodies are arranged annularly and located at an outer peripheral side of the burning portion of the infrared burner.

According to the cooking appliance with a high-temperature zone described above, the cover body comprises one upper end plate and two first inclined plates, the two first inclined plates are arranged symmetrically to each other, and a distance between upper ends of the two first inclined plates is less than a distance between lower ends of the two first inclined plates; the upper end plate is located between and connected to the upper ends of the two first inclined plates, the cavity is formed between the upper end plate and the two first inclined plates, and at least one end of the cavity forms the opening; and the plurality of first heat dissipation holes are arranged on the upper end plate and the two first inclined plates, and the bottoms of the two first inclined plates are adjacent to the infrared burner.

According to the cooking appliance with a high-temperature zone described above, the upper end plate comprises two second inclined plates which are provided symmetrically to each other, upper ends of the two second inclined plates are connected to each other and form an included angle therebetween, and the included angle is an acute angle or an obtuse angle; lower ends of the second inclined plates are respectively connected to the upper ends of the two first inclined plates; and an included angle is formed between the first inclined plate and the second inclined plate, and the included angle is an obtuse angle.

According to the cooking appliance with a high-temperature zone described above, the inner walls of the front side and rear side of the heating chamber are provided with a first support step respectively, a front end and a rear end of each of the first inclined plates are provided with step bodies, and each of the step bodies is erected on the two first support steps respectively.

According to the cooking appliance with a high-temperature zone described above, the burning system further comprises a third heating group, and the first heating group and the third heating group are located on two opposite sides of the second heating group respectively.

According to the cooking appliance with a high-temperature zone described above, the third heating group comprises a third grilling net and a third heat generating device capable of generating heat, and the third heat generating device is located below the third grilling net.

According to the cooking appliance with a high-temperature zone described above, the first heat generating device, the second heat generating device and the third heat generating device each comprise a gas burner formed by extending toward the inner walls of the front side and the rear side of the heating chamber and a temperature equalizing plate located above the gas burner; the temperature equalizing plate is formed with a plurality of second heat dissipation holes; and the temperature equalizing plate of the second heat generating device is located at least partially below the second grilling net.

According to the cooking appliance with a high-temperature zone described above, the first grilling net, the second grilling net and the third grilling net are located on a same plane, and meshes in the second grilling net are arranged in a shape different from that of meshes in the first grilling net and/or that of meshes in the third grilling net respectively.

The cooking appliance with a high-temperature zone according to the present invention has the following beneficial effects:

1. Arrangement of the high-temperature grilling zone and an ordinary uniform temperature grilling zone composed of the first heating group and the third heating group in the oven can additionally provide an infrared high-temperature grilling function for users and satisfy needs of the users for uniform temperature performance and high-temperature grilling on the premise of realizing the uniform temperature performance in the cooking appliance.
2. The meshes in the first grilling net and/or the meshes in the third grilling net are arranged in a shape different that of the meshes in the second grilling net respectively, so that the users can easily distinguish the ordinary uniform temperature grilling zone from the high-temperature grilling zone.
3. The second heat generating device is arranged on at least one of the opposite sides of the high-temperature generating device, so that the high-temperature grilling zone can achieve high-temperature effect for the purpose of high-temperature grilling.

Figure 1:
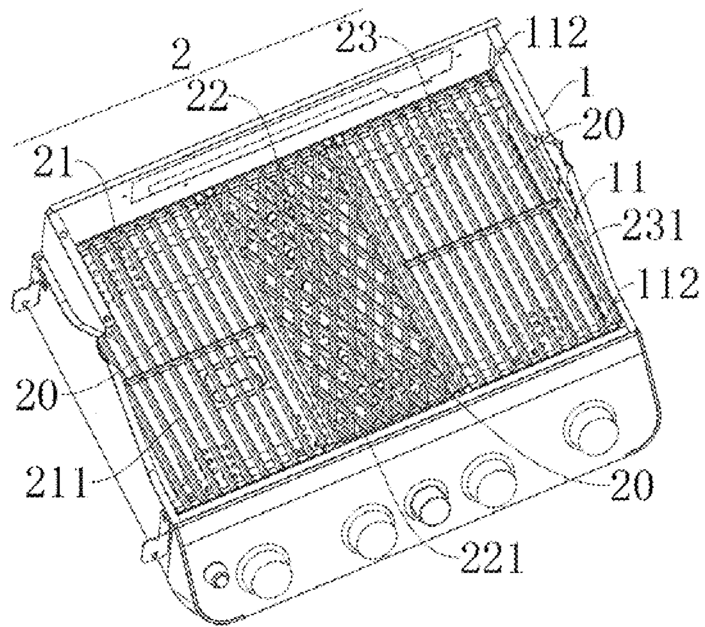
FIG. 1 is an overall structural diagram (I) of an oven.

Reference numerals in the drawings: housing 1, heating chamber 11, first support step 111, second support step 112, burning system 2, mesh 20, first heating group 21, first grilling net 211, first heat generating device 212, second heat generating device 213, gas burner 214, temperature equalizing plate 215, second heat dissipation hole 216, first subsection 217, second subsection 218, second heating group 22, high-temperature generating device 220, second grilling net 221, infrared heating device 222, infrared burner 223, cover body 224, ignition needle 225, first inclined plate 226, upper end plate 227, second inclined plate 228, step body 229, first heat dissipation hole 230, third heating group 23, third grilling net 231, third heat generating device 232, cavity 234, opening 235, and positioning body 236.

DESCRIPTION OF THE EMBODIMENTS

The technical solutions of the present invention will be described clearly and completely below with reference to the accompanying drawings in the embodiments of the present invention.

Embodiments

Figure 2:
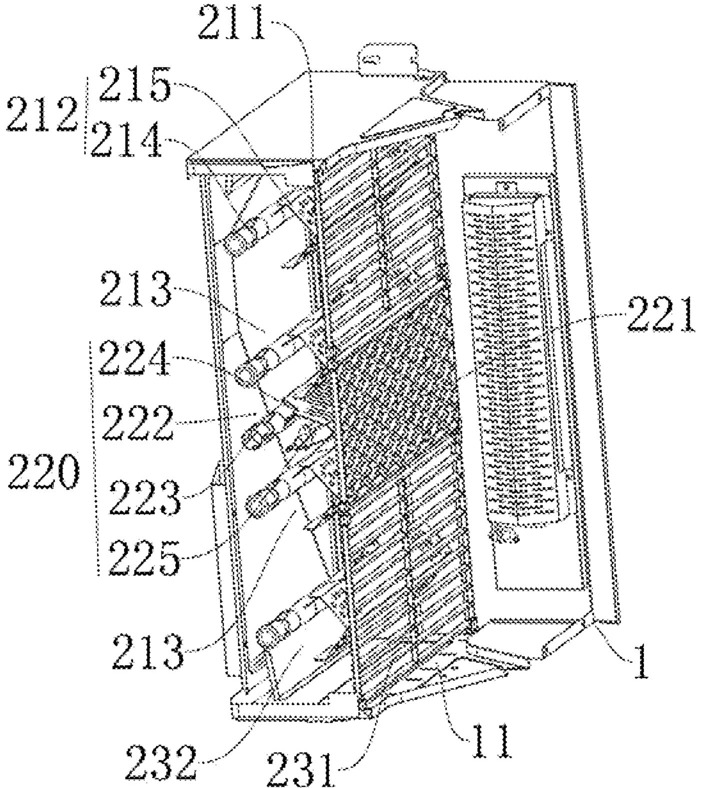
FIG. 2 is an overall structural diagram (II) of the oven.
Figure 3:
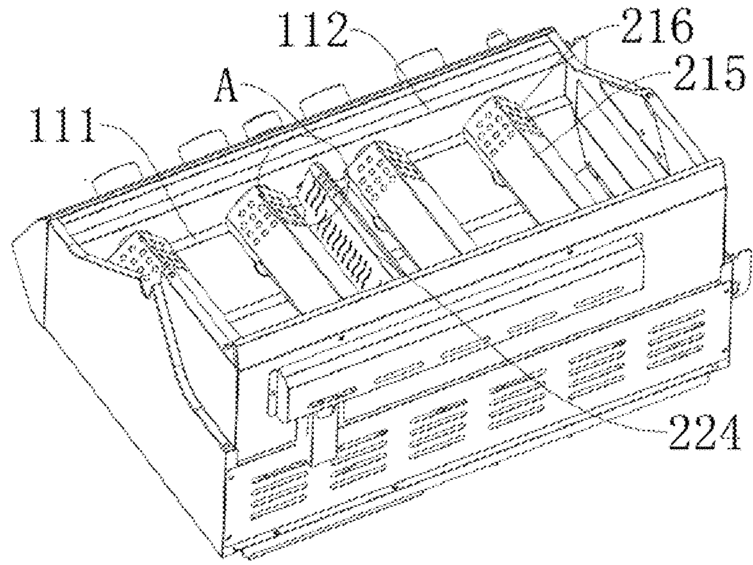
FIG. 3 is an overall structural diagram (III) of the oven.
Figure 4:
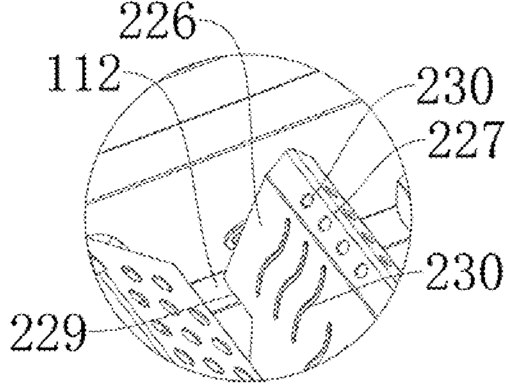
FIG. 4 is an enlarged view of A.
Figure 5:
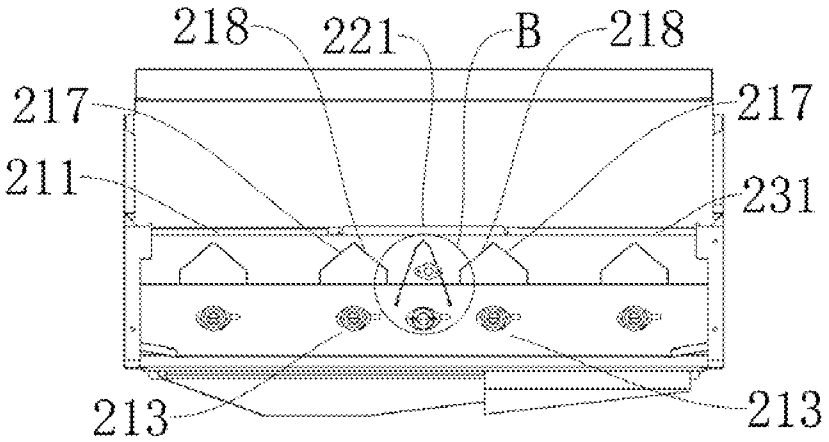
FIG. 5 is an overall structural diagram (IV) of the oven.
Figure 6:
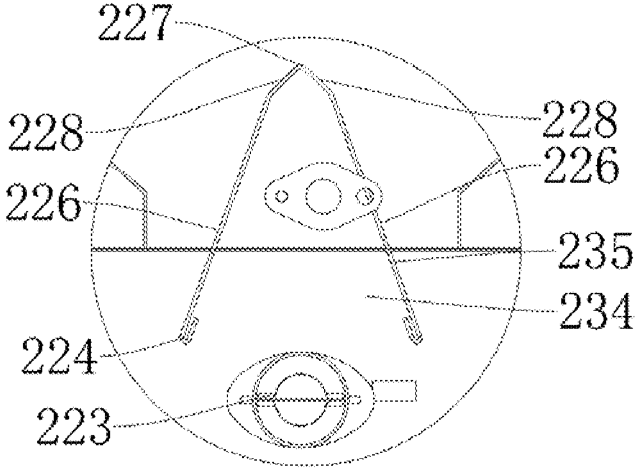
FIG. 6 is an enlarged view of B.
Figure 7:
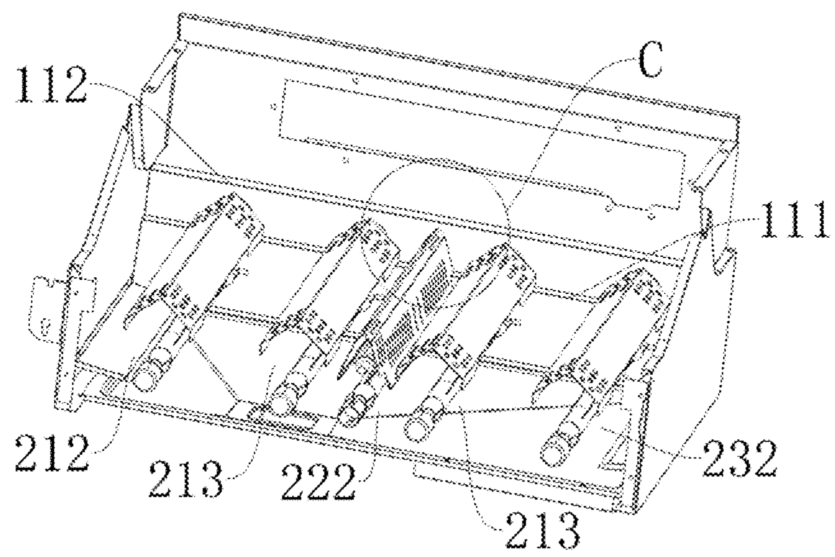
FIG. 7 is an overall structural diagram (V) of the oven.
Figure 8:
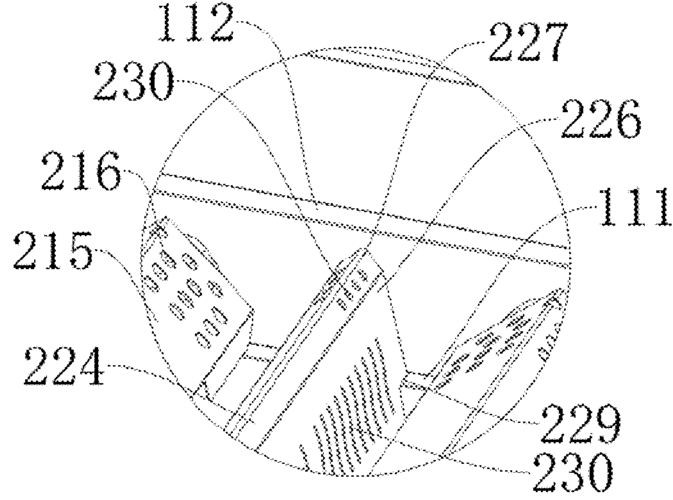
FIG. 8 is an enlarged view of C.
Figure 9:
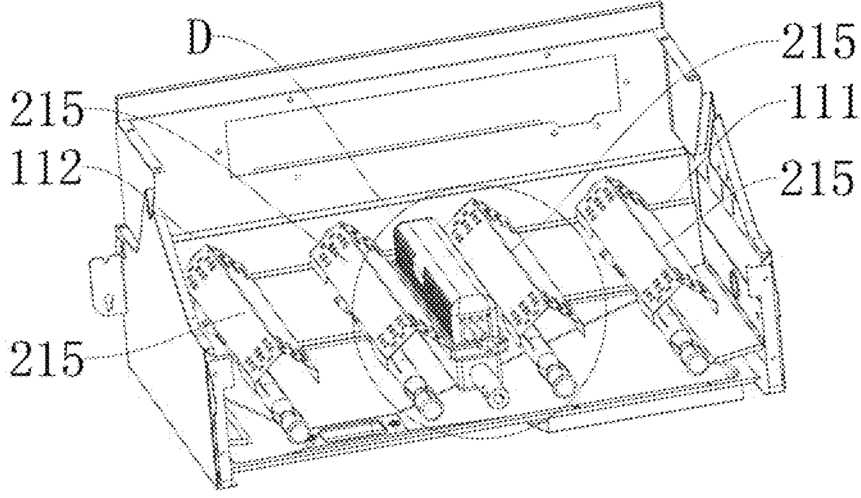
FIG. 9 is an overall structural diagram (VI) of the oven.
Figure 10:
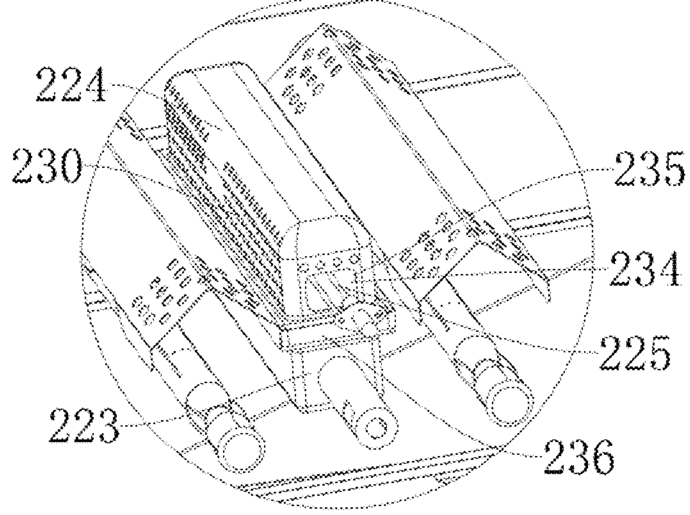
FIG. 10 is an enlarged view of D.
Figure 11:
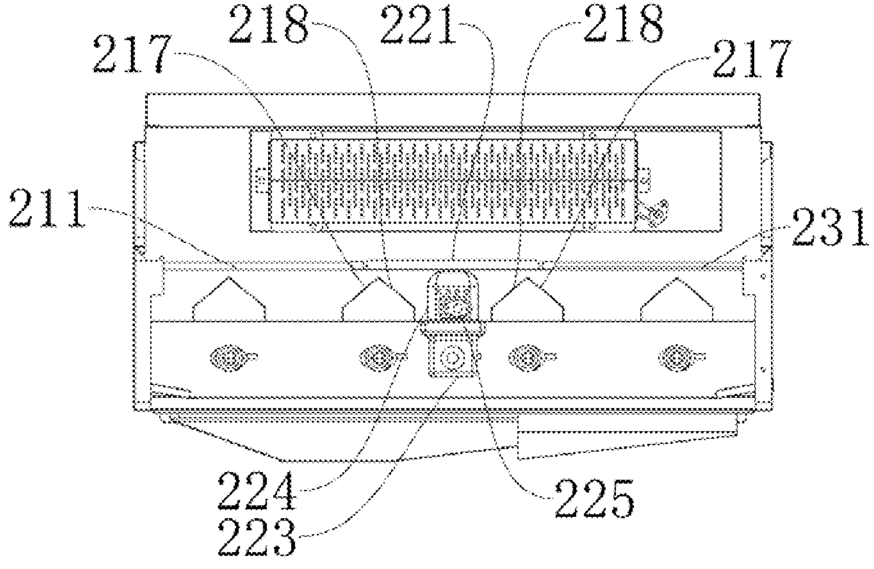
FIG. 11 is an overall structural diagram (VII) of the oven.
Figure 12:
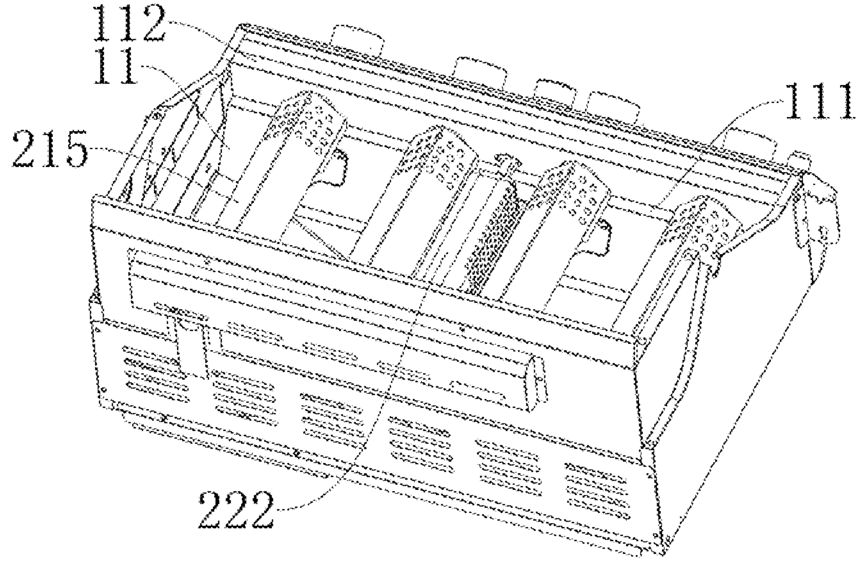
FIG. 12 is an overall structural diagram (VIII) of the oven.
Figure 13:
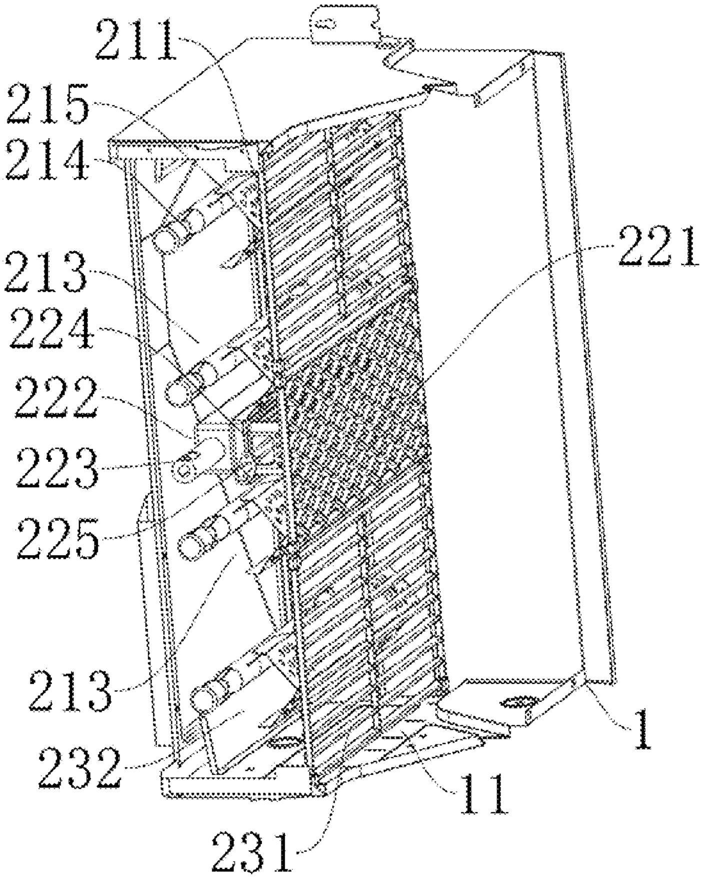
FIG. 13 is an overall structural diagram (IX) of the oven.

As shown in FIGS. 1-13, a cooking appliance with a high-temperature zone described in the present embodiment comprises a housing 1 and a burning system 2, the housing 1 comprises a heating chamber 11, the burning system 2 is mounted within the heating chamber 11, the burning system 2 comprises a first heating group 21 and a second heating group 22, the second heating group 22 is located beside the first heating group 21, the first heating group 21 only makes a temperature of a first grilling net uniform, the second heating group 22 can make a second grilling net there generate a high heat with a high temperature, and the temperature of the second grilling net is higher than the temperature of the first grilling net in the first heating group 21, so as to meet the requirements of both high-temperature grilling and ordinary uniform temperature grilling.

The first heating group 21 comprises the first grilling net 211 and a first heat generating device 212 capable of generating heat; the first heat generating device 212 is located below the first grilling net 211, and the first heat generating device 212 comprises a gas burner 214 formed by extending towards inner walls of a front side and a rear side of the heating chamber 11 and a temperature equalizing plate 215 located above the gas burner 214; a plurality of second heat dissipation holes 216 are formed on the temperature equalizing plate 215, the temperature equalizing plate 215 has a cross section with an inverted V-shaped structure or an arc-shaped structure, and a lower end of the temperature equalizing plate 215 is arranged away from the gas burner 214; the gas burner 214 is of a tubular structure, and a flame nozzle and a gas input port are formed on the gas burner 214 of the tubular structure, and an ignition needle of an igniter is located in the gas input port; and when a fuel gas is input into a cavity of the gas burner 214, the ignition needle of the igniter generates a spark to cause the flame to be emitted from the nozzle, so that the generated heat is dissipated upwards through the second heat dissipation holes 216 and a peripheral zone of the temperature equalizing plate 215, so that the first grilling net 211 is heated uniformly.

The first grilling net 211 is preferably a metal grilling net. As the gas burner 214 is spaced far from the temperature equalizing plate, and the flame emitted by the gas burner 214 is blocked by the temperature equalizing plate, a grilling zone having the zone of the first heating group 21 has relatively low heat, relatively poor heat radiation, and relatively mild and uniform temperature, so that the first grilling net also has a relatively low temperature.

The second heating group 22 comprises the second grilling net 221 and a high-temperature generating device 220 capable of generating high heat, the high-temperature generating device 220 is located at least partially below the second grilling net 221, the high-temperature generating device 220 comprises an infrared heating device 222 and a second heat generating device 213 located on at least one of two opposite sides of the infrared heating device 222, and the infrared heating device 222, the second heat generating device 213 and the second grilling net 221 form an infrared high-temperature zone together; and the second heat generating device 213 is located at least partially below the second grilling net 221. Specifically, the infrared heating device 222 comprises an infrared burner 223, a cover body 224 and an ignition needle 225, both ends of the cover body 224 are formed by extending toward inner walls of a front side and a rear side of the heating chamber 11 respectively, the cover body 224 is arranged above a burning portion of the infrared burner 223, the cover body 224 is provided with a cavity 234, an opening 235 in communication with the cavity 234 and a plurality of first heat dissipation holes 230, and the ignition needle 225 is placed in the cavity 234 through the opening 235.

Further, the cover body 224 has a structure as follows: the cover body 224 comprises one upper end plate 227 and two first inclined plates 226, the two first inclined plates 226 are arranged symmetrically to each other, and a distance between upper ends of the two first inclined plates 226 is less than a distance between lower ends of the two first inclined plates 226; the upper end plate 227 is located between the upper ends of the two first inclined plates 226, the upper end plate 227 comprises two second inclined plates 228 which are provided symmetrically to each other, upper ends of the two second inclined plates 228 are connected to each other and form an included angle therebetween, and the included angle is an acute angle or an obtuse angle; lower ends of the second inclined plates 228 are respectively connected to the upper ends of the two first inclined plates 226; and an included angle is formed between the first inclined plate 226 and the second inclined plate 228, and the included angle is an obtuse angle; the cavity 234 is formed between the upper end plate 227 and the two first inclined plates 226, and at least one end of the cavity 234 forms the opening 235; the plurality of first heat dissipation holes 230 are arranged on the upper end plate 227 and the two first inclined plates 226; the infrared burner 223 uses a fuel gas as a fuel, and when the fuel gas enters the burner through the opening 235, the ignition needle 225 can generate a spark to cause the fuel gas to burn; the bottoms of the two first inclined plates 226 are adjacent to the infrared burners 223, so that it is difficult for the heat generated by burning to escape to a periphery of the cover body 224, so that the cover body 224 is rapidly burned red to generate infrared heat radiation to the second grilling net 221, and in this case, most of the heat is discharged through the plurality of first heat dissipation holes 230 to radiate to the second grilling net 221, and good heat radiation is achieved due to the infrared radiation; and such heat is combined with the heat generated by the second heat generating device 213, so that the second grilling net 221 generates high heat, so that the second grilling net 221 has a temperature higher than that of the first grilling net, achieving the purpose of quick grilling. Preferably, the upper end plate 227 and the two first inclined plates 226 are combined with each other to form an integral metal plate structure, and are made of stainless steel.

Preferably, the inner walls of the front side and rear side of the heating chamber 11 are provided with a first support step 111 respectively, a front end and a rear end of each of the first inclined plates 226 are provided with step bodies 229, and each of the step bodies 229 is erected on the two first support steps 111 respectively, which facilitates mounting and dismounting of the cover body 224 and improves service performance.

In another embodiment, the infrared burner 223 and the cover body 224 of the infrared heating device 222 can have alternative structures as follows: the infrared burner 223 is changed to an infrared burner head, the burner head is of a rectangular parallelepiped structure, the cover body 224 is of a rectangular parallelepiped structure, an edge of a lower port portion of the cover body 224 is formed with positioning bodies 236 which are provided continuously or at intervals, the positioning bodies 236 are arranged annularly and located at an outer peripheral side of the burning portion of the infrared burner 223, that is, the positioning bodies are sheathed on the burning portion of the infrared burner 223, the opening 235 is arranged at one end of the cover body 224, a plurality of first heat dissipation holes 230 are formed on left and right vertical surfaces of the cover body 224, and the cover body 224 and the positioning bodies 236 are of an integral metal structure in order to adaptively mount the infrared burner 223.

Based on the above-mentioned oven structure, the burning system 2 further comprises a third heating group 23, the third heating group 23 also only makes the temperature of the third grilling net 231 uniform, and the first heating group 21 and the third heating group 23 are located on two opposite sides of the second heating group 22 respectively; the third heating group 23 comprises the third grilling net 231 and a third heat generating device 232 capable of generating heat, the third heat generating device 232 is located below the third grilling net 231, and the second heat generating device 213 comprises a first subsection 217 and a second subsection 218; the first subsection 217 of the second heat generating device 213 is located below the second grilling net 221, and the second subsection 218 of the second heat generating device 213 is located below the first grilling net 211; the heat generated by the second heat generating device 213 is superimposed with the heat generated by the infrared heating device to generate a high temperature; the second heat generating device 213 is generally arranged on both sides of the infrared heating device 222, so that the high temperature can be realized under the condition that the temperature of the second grilling net 221 is uniform, thereby achieving good high-temperature grilling effect in the high-temperature zone and improving the service performance of the high-temperature zone. However, in use, the two second heat generating devices 213 can be activated alone or simultaneously according to the actual needs. The second heat generating device 213 may also be arranged on one side of the infrared heating device 222 as required.

Preferably, both the second heat generating device 213 and the third heat generating device 232 comprise a gas burner 214 formed by extending towards the inner walls of the front side and the rear side of the heating chamber 11 and a temperature equalizing plate 215 located above the gas burner 214; the temperature equalizing plate 215 is formed with a plurality of second heat dissipation holes 216, the temperature equalizing plate 215 has a cross section with an inverted V-shaped structure or an arc-shaped structure, and a lower end of the temperature equalizing plate 215 is arranged away from the gas burner 214; the gas burner 214 is of a tubular structure, and a flame nozzle and a gas input port are formed on the gas burner 214 of the tubular structure, and an ignition needle of an igniter is located in the gas input port; and when a fuel gas is input into a cavity of the gas burner 214, the ignition needle of the igniter generates a spark to cause the flame to be emitted from the nozzle, so that the generated heat is dissipated upwards through the second heat dissipation holes 216 and a peripheral zone of the temperature equalizing plate 215, so that the second grilling net 221 and the third grilling net 231 are heated uniformly. The first grilling net 211 is preferably a metal grilling net, and in the second heat generating device 213, a portion of the temperature equalizing plate 215 greater than or equal to one half thereof is located below the second grilling net.

Further, front and rear ends of all the temperature equalizing plates 215 are erected on two second support steps 112 respectively, so that all the temperature equalizing plates 215 are on a same plane.

Preferably, second support steps 112 located above the first support steps 111 are formed on the inner walls of the front side and the rear side of the heating chamber 11, and front and rear ends of all the grilling nets are erected on two second support steps 112 respectively, so that all the grilling nets are located on a same plane, which facilitates dismounting and mounting of the grilling nets and realizes equal distance between each of the grilling nets and the temperature equalizing plate 215, thus achieving uniform temperature at each ordinary grilling zone and avoiding a large temperature difference.

Preferably, the first grilling net 211, the second grilling net 221 and the third grilling net 231 comprise a frame body and grid bodies located in the frame body, meshes 20 in the grid bodies in the first grilling net 211 and the third grilling net 231 are all polygonal meshes 20 or circular meshes 20 or elongated meshes 20, and meshes 20 in the grid bodies in the second grilling net 221 are diamond meshes 20, so that the meshes 20 in the first grilling net 211 and the meshes 20 in the third grilling net 231 are respectively arranged in a shape different from that of the meshes 20 in the second grilling net 221. Generally, elongated meshes 20 are preferred, which is convenient to identify a position having the first grilling net 211 and the third grilling net 231 as an ordinary uniform temperature grilling zone, and a position having the second grilling net 221 as a high-temperature grilling zone.

What is claimed is:

1. A cooking appliance with a high-temperature zone, comprising:

a housing comprising a heating chamber; and a burning system mounted within the heating chamber, the burning system comprising a first heating group and a second heating group;

the first heating group comprising a first grilling net and a first heat generating device capable of generating heat, and the first heat generating device being located below the first grilling net;

the second heating group being located beside the first heating group, the second heating group comprising a second grilling net and a high-temperature generating device capable of generating high heat, the high-temperature generating device being located at least partially below the second grilling net, the high-temperature generating device comprising an infrared heating device and a second heat generating device located on at least one of two opposite sides of the infrared heating device, and the infrared heating device, the second heat generating device and the second grilling net forming the high-temperature zone together; and the second heat generating device being located at least partially below the second grilling net;

the infrared heating device comprises an infrared burner, a cover body and an ignition needle, both ends of the cover body are formed by extending toward inner walls of a front side and a rear side of the heating chamber respectively, the cover body is arranged above a burning portion of the infrared burner, the cover body is provided with a cavity, an opening in communication with the cavity and a plurality of first heat dissipation holes, and the ignition needle is placed in the cavity through the opening; and the cover body comprises one upper end plate and two first inclined plates, the two first inclined plates are arranged symmetrically to each other, and a distance between upper ends of the two first inclined plates is less than a distance between lower ends of the two first inclined plates; the upper end plate is located between and connected to the upper ends of the two first inclined plates, the cavity is formed between the upper end plate and the two first inclined plates, and at least one end of the cavity forms the opening; and the plurality of first heat dissipation holes are arranged on the upper end plate and the two first inclined plates, and the bottoms of the two first inclined plates are adjacent to the infrared burner.

2. The cooking appliance with a high-temperature zone according to claim 1, wherein the upper end plate comprises two second inclined plates which are provided symmetrically to each other, upper ends of the two second inclined plates are connected to each other and form an included angle therebetween, and the included angle is an acute angle or an obtuse angle; lower ends of the second inclined plates are respectively connected to the upper ends of the two first inclined plates;

and an included angle is formed between the first inclined plate and the second inclined plate, and the included angle is an obtuse angle.

3. The cooking appliance with a high-temperature zone according to claim 1, wherein the inner walls of the front side and rear side of the heating chamber are provided with a first support step respectively, a front end and a rear end of each of the first inclined plates are provided with step bodies, and each of the step bodies is erected on the two first support steps respectively.

4. The cooking appliance with a high-temperature zone according to claim 3, wherein the burning system further comprises a third heating group, and the first heating group and the third heating group are located on two opposite sides of the second heating group respectively.

5. The cooking appliance with a high-temperature zone according to claim 4, wherein the third heating group comprises a third grilling net and a third heat generating device capable of generating heat, and the third heat generating device is located below the third grilling net.

6. The cooking appliance with a high-temperature zone according to claim 5, wherein the first heat generating device, the second heat generating device and the third heat generating device each comprise a gas burner formed by extending toward the inner walls of the front side and the rear side of the heating chamber and a temperature equalizing plate located above the gas burner; the temperature equalizing plate is formed with a plurality of second heat dissipation holes; and the temperature equalizing plate of the second heat generating device is located at least partially below the second grilling net.

7. The cooking appliance with a high-temperature zone according to claim 5, wherein the first grilling net, the second grilling net and the third grilling net are located on a same plane, and meshes in the second grilling net are arranged in a shape different from that of meshes in the first grilling net and/or that of meshes in the third grilling net respectively.

* * * * *